United States Patent [19]

Kumura et al.

[11] Patent Number: 4,764,155
[45] Date of Patent: Aug. 16, 1988

[54] METHOD OF CONTROLLING CONTINUOUSLY VARIABLE TRANSMISSION

[75] Inventors: Haruyoshi Kumura, Yokohama; Sigeaki Yamamuro, Zushi; Hiroyuki Hirano, Yokohama; Keiju Abo, Yokosuka; Masaki Nakano, Kawasaki, all of Japan

[73] Assignee: Nissan Motor Co., Ltd., Yokohama, Japan

[21] Appl. No.: 804,510

[22] Filed: Dec. 4, 1985

[30] Foreign Application Priority Data

Dec. 6, 1984 [JP] Japan .................. 59-256565

[51] Int. Cl.[4] ............................................. F16H 11/06
[52] U.S. Cl. .......................................... 474/12; 474/17; 474/70
[58] Field of Search ............... 474/17, 12, 70; 74/856, 74/861, 866

[56] References Cited

U.S. PATENT DOCUMENTS

| 4,526,557 | 7/1985 | Tanaka et al. | 474/17 X |
| 4,543,077 | 9/1985 | Yamamuro et al. | 474/12 |
| 4,656,587 | 4/1987 | Osanai et al. | 474/12 X |
| 4,704,683 | 11/1987 | Osanai | 474/12 X |

FOREIGN PATENT DOCUMENTS

57-161346 10/1982 Japan .

Primary Examiner—Stephen J. Novosad
Assistant Examiner—Matthew Smith
Attorney, Agent, or Firm—Foley & Lardner, Schwartz, Jeffery, Schwaab, Mack, Blumenthal & Evans

[57] ABSTRACT

After the throttle opening degree has exceeded a predetermined value, a target value in engine speed that varies in correspondance with the throttle opening degree is modified to vary in a second pattern whereby the continuously variable transmission is shifted to a predetermined reduction ratio and then kept operating at the predetermined reduction ratio so as to allow the engine speed to increase with the variation in vehicle speed, thus providing an increased acceleration feel.

7 Claims, 8 Drawing Sheets

METHOD OF CONTROLLING CONTINUOUSLY VARIABLE TRANSMISSION

BACKGROUND OF THE INVENTION

The present invention relates to a method of controlling a continuously variable transmission.

Figure 10:
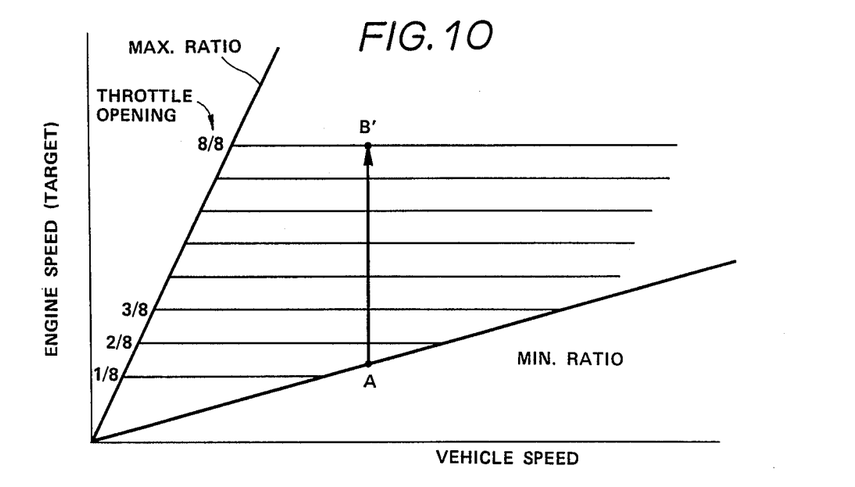
FIG. 10 is a graph showing a conventional pattern used by the known method discussed before.

A method of controlling a continuously variable transmission is known from Japanese patent application laid-open publication No. 57-161346 which has a U.S. counterpart, i.e., U.S. Pat. No. 4,543,077, issued to Yamamuro et al., on Sept. 24, 1985. According to this known method, there is stored a predetermined pattern of correspondence between throttle opening degree and vehicle speed. The predetermined pattern is retrieved in accordance with detected values in throttle opening degree and in vehicle speed in order to give a desired revolution speed value driving pulley. The transmission for the reduction ratio is controlled by a shift motor in so as to achieve the desired driving pulley revolution speed value. The predetermined pattern stored is illustrated in FIG. 10. According to this pattern, a predetermined value of driving pulley revolution speed (i.e., engine speed) corresponds to one degree in throttle opening, and the same value in driving pulley revolution speed is maintained for the same throttle opening degree irrespective of how high the vehicle speed is.

With this pattern, the transmission cannot meet a rapid acceleration demand which occurs during a shift, initiated after a rapid increase in engine throttle opening, from a stable running state at substantially the same vehicle speed with a relatively small throttle opening. During a transient period until a new target reduction ratio is attained which corresponds to a new target engine speed that is set after the rapid increase in engine throttle opening, the transmission continuously shifts, thus requiring a long time before the new target reduction ratio is attained. Thus, during this transient period, the engine begins to race because the engine speed increases when the reduction ratio increases, thus resulting in a delay in an increase in driving force resulting in a sluggish response to the rapid acceleration demand.

Figure 8:
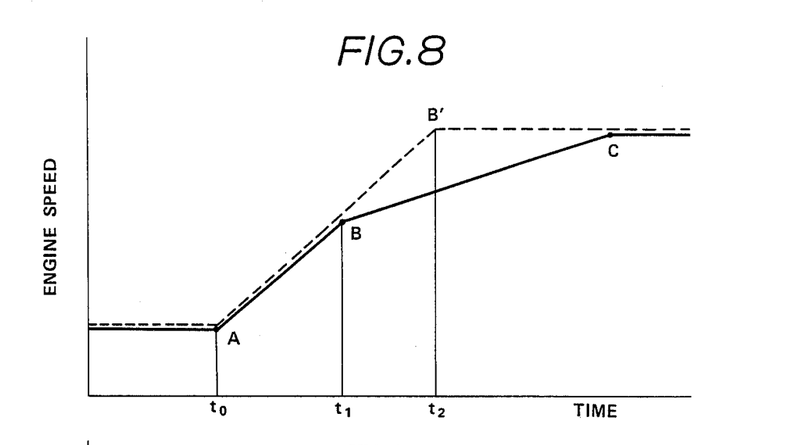
FIG. 8 is a graph showing the variation in engine speed during a shift.
Figure 9:
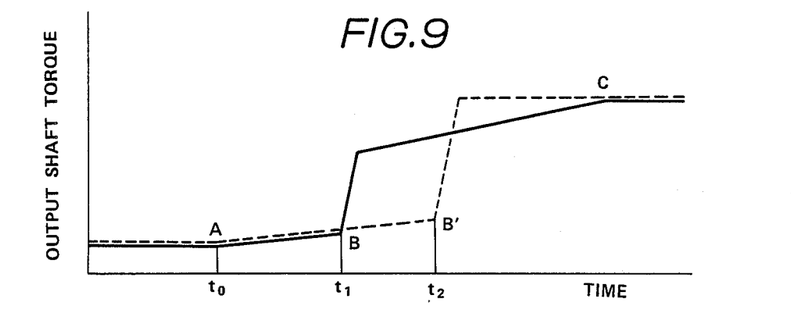
FIG. 9 is a graph showing the variation in driving force during a shift.

Describing in more detail referring to FIGS. 8 to 10, let us now assume that a rapid increase in engine throttle opening occurs under a condition expressed by a point A in FIG. 10 to cause a change in target engine speed to a new target engine speed as indicated by a point B'. After this change in target engine speed, the actual engine speed rises as shown by the dashed line in FIG. 8 to reach the target engine speed at the point B'. Since, during this transient period, the engine is about to race, the engine cannot increase its driving force immediately. As shown by the dashed line in FIG. 9, an increase in the driving force is gradual initially until it increases rapidly after the completion of shifting operation in the transmission at the point B'. Thus, during a transient period between the instants $t_0$ and $t_2$, an acceleration feel is not provided, thus deteriorating the driving feel.

The present invention aims at solving the above mentioned problem by providing a quick response to an acceleration demand so as to enhance the driving feel.

SUMMARY OF THE INVENTION

According to the present invention, there is provided a method of controlling a continuously variable transmission whereby engine speed is caused to vary in proportion to vehicle speed when engine load has exceeded a predetermined value by causing the continuously variable transmission to keep a reduction ratio at a predetermined state.

Specifically, there is provided a method of controlling a continuously variable transmission for a motor vehicle having an engine that operates subject to varying load, the continuously variable transmission having an input shaft drivingly connected to the engine, the method comprising the steps of:

detecting the load and generating a load indicative signal indicative of the load detected;

generating a target value indicative signal indicative of a target value which is variable in a first pattern in correspondence with said load indicative signal and controlling a shift in reduction ratio in the continuously variable transmission in such a manner as to bring an actual value into correspondence with said target value before said load indicative signal exceeds a predetermined value; and modifying the variation in said target value into a second pattern after said load indicative signal has exceeded said predetermined value, whereby said continuously variable transmission is shifted to a predetermined reduction ratio and then kept operating at said predetermined reduction ratio.

More specifically, according to the method according to the present invention, after the engine load has exceeded a predetermined value as a result of a rapid acceleration demand, a predetermined reduction ratio is set irrespective of how great the engine load is. Thus, the shift is completed quickly and the engine speed is allowed to increase with an increase in vehicle speed. Since the transient period till the completion of the shift has been shortened and the necessary increase in driving force is provided at an early timing, there is provided an improved response to the acceleration demand, resulting in an enhanced drive feel. Besides, after the completion of this shift, the same acceleration feel as provided by the gear type transmission is provided because the engine speed increases with the vehicle speed.

DESCRIPTION OF THE EMBODIMENT

Figure 2:
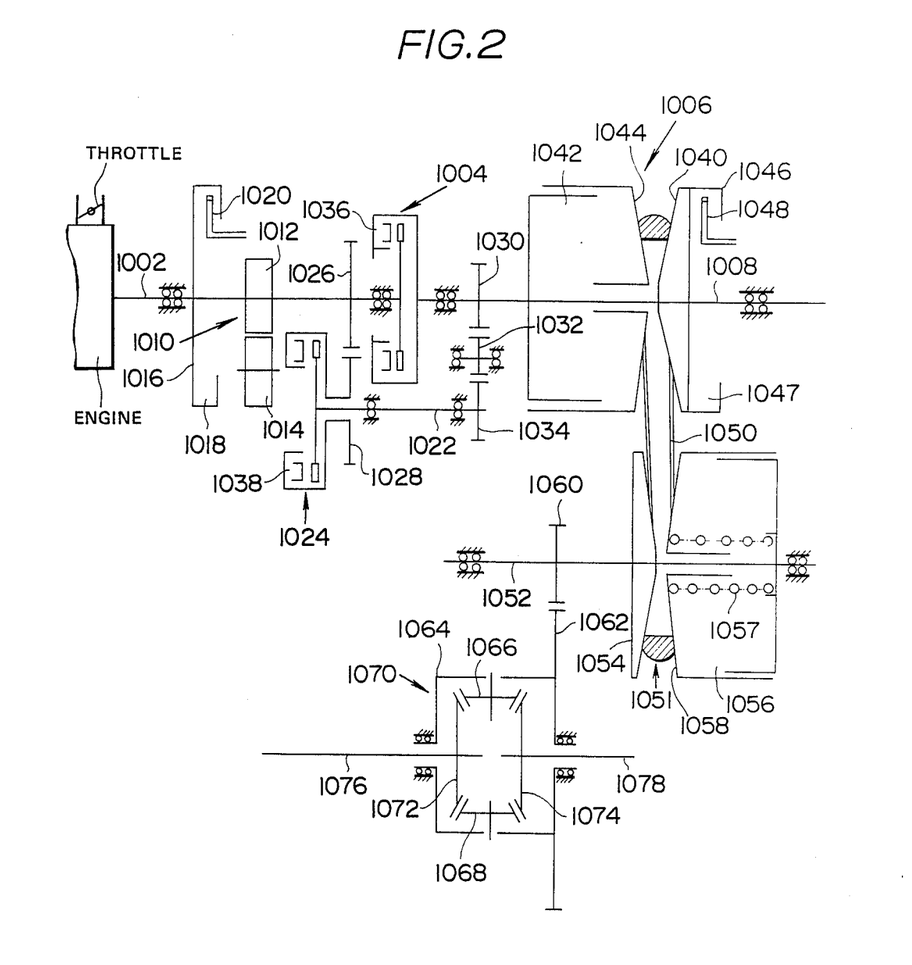
FIG. 2 is a schematic view of a continuously variable transmission in operative association with an engine of a motor vehicle which has a throttle that opens in degrees.
Figure 3A:
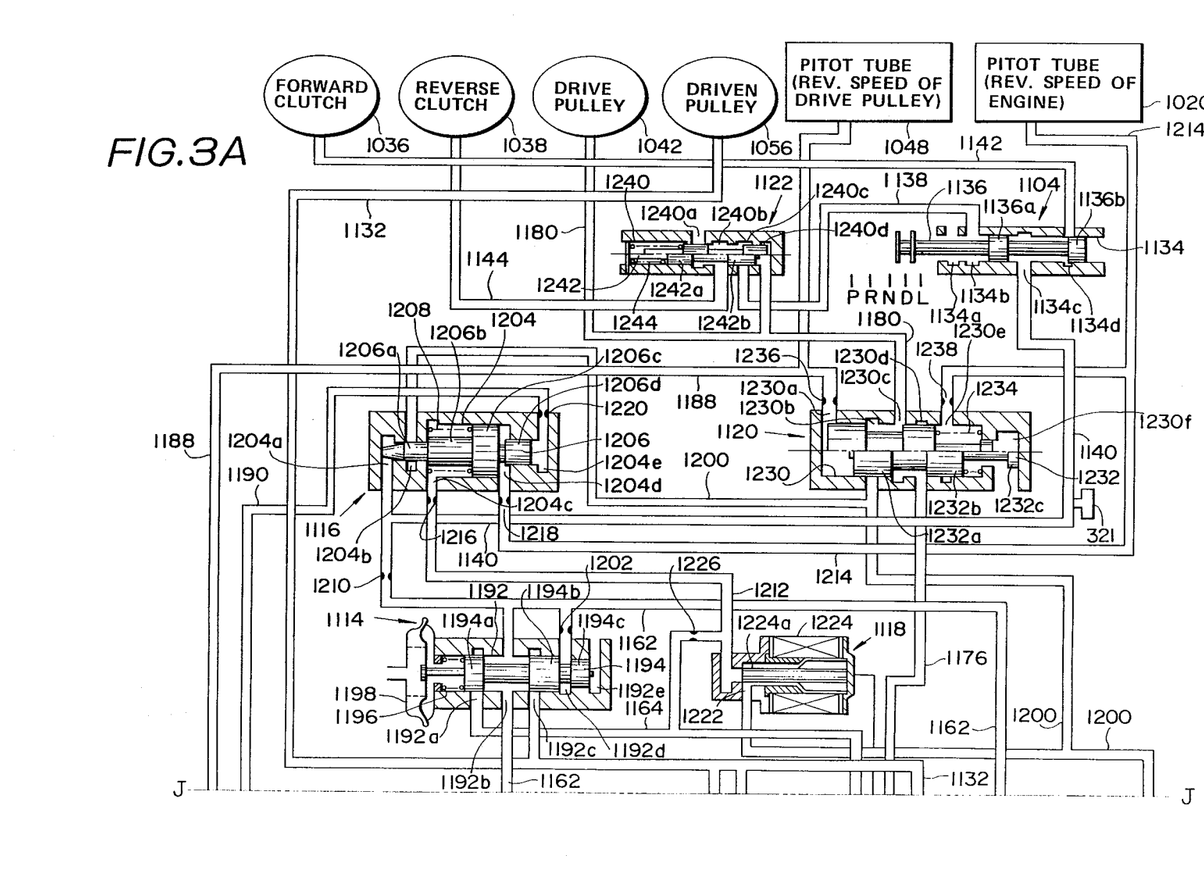
FIGS. 3(A) and 3(B), when combined, illustrate a hydraulic system for the continuously variable transmission.
Figure 3B:
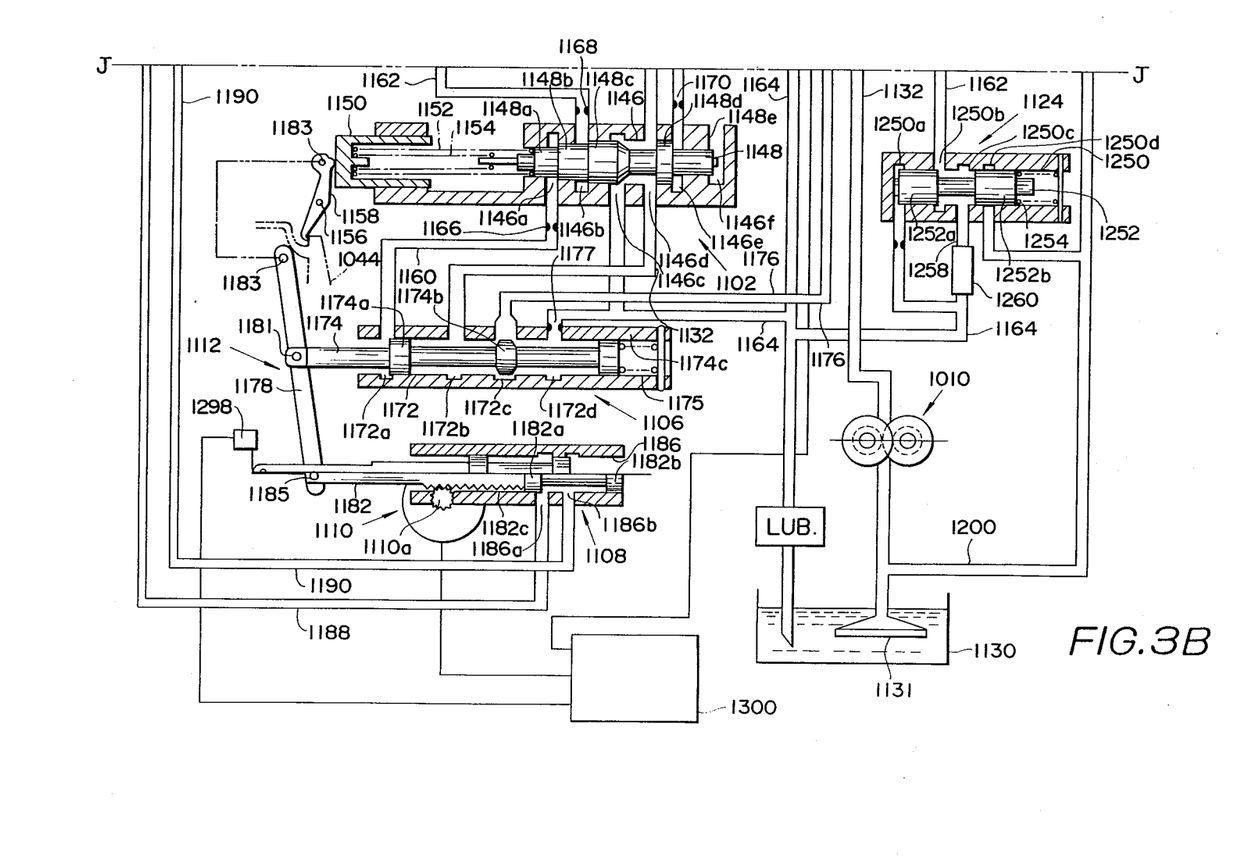

Referring to FIG. 2, there is schematically shown a continuously variable transmission. Referring to FIGS. 3A and 3B, there is shown a hydraulic control system for the continuously variable transmission.

The continuously variable transmission shown in FIG. 2 and the hydraulic control system shown in FIGS. 3(A) and 3(B) are described in detail in U.S. patent application Ser. No. 489,600 (now U.S. Pat. No. 4,579,021 issued Apr. 1, 1986) (see FIGS. 24, 25A and 25B) filed by Shigeaki YAMAMURO et al. on Apr. 28, 1984 and commonly assigned herewith. That portion of the disclosure of this copending U.S. patent application has been incorporated herein by reference.

Briefly, the continuously variable transmission shown in FIG. 2 has an input shaft 1002 drivingly connected to an internal combustion engine with an engine load control member in the form of a throttle valve disposed in an air induction system of the engine. The throttle opens in degrees in response to the actuation of an accelerator pedal to vary a load applied to the engine. Designated by reference numeral 1004 is a forward clutch and designated by reference numeral 1024 is a reverse clutch. Engagement of the forward clutch 1004 or the reverse clutch 1024 permits the transmission of the engine torque to a driving pulley 1006 and then to a pair of output shafts 1076 and 1078 via a V-belt 1050 and a driven or follower pulley 1051. The continuously variable transmission further comprises a driving shaft 1008, an oil pump 1010, a driving gear 1012, a driven gear 1014, a rotary flume 1016, an oil reservoir 1018, a pitot tube 1020, an auxiliary shaft 1022, gears 1026, 1028, 1030, 1032, and 1034, piston chambers 1036 and 1038, an axially fixed conical disc 1040, a driving pulley cylinder chamber 1042, an axially movable conical disc 1044, a rotary flume 1046, an oil reservoir 1047, a pitot tube 1048, a driven or follower shaft 1052, an axially fixed conical disc 1054, a driven or follower pulley cylinder chamber 1056, a spring 1057, an axially movable conical disc 1058, a gear 1060, a ring gear 1062, a differential case 1064, pinion gears 1066 and 1068, a differential 1070, and side gears 1072 and 1074.

Briefly, the hydraulic control system shown in FIGS. 3(A) and 3(B) comprises the oil pump 1010, a line pressure regulator valve 1102, a manual valve 1104, a shift control valve 1106, a clutch complete engagement control valve 1108, a shift motor in the form of a stepper motor 1110, a shift control mechanism 1112, a throttle valve 1114, a starting valve 1116, a start adjustment valve 1118, a maximum reduction ratio maintaining valve 1120, a reverse inhibitor valve 1122, a lubrication valve 1124, a tank 1130. These elements are interconnected as illustrated and cooperate with each other to control fluid supply to and fluid discharge from the piston chamber 1036 for the forward clutch 1004, the piston chamber 1038 for the reverse clutch 1024, the driving pulley cylinder chamber 1042 and the driven pulley cylinder chamber 1056. Fluid connections to the pitot tubes 1020 and 1048 are also made. The hydraulic control system is operatively associated with an electronic control unit 1300 that serves as a shift control device and also as a clutch control device.

Figure 4:
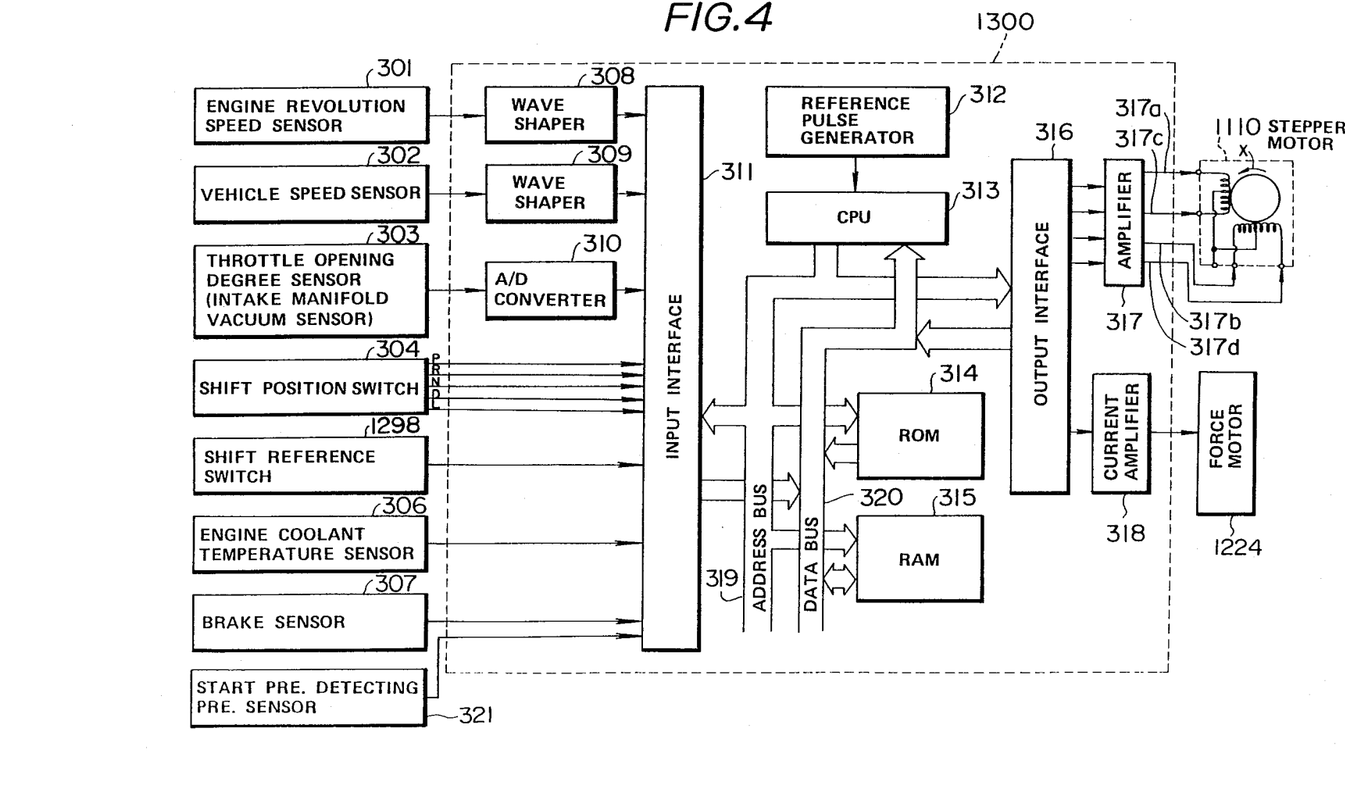
FIG. 4 is a block diagram of a control unit.

Referring to FIG. 4, there is shown the control unit 1300 in operatively association with sensors 301, 302, 304, 306, 307 and 321 and switches 304 and 1298, and also with the stepper motor 1110 and a force motor 1224 of the start adjustment valve 1118 shown in FIG. 3(A). The construction of the control unit 1300 and a series of operations executed by this control unit 1300 in controlling the forward clutch 1004 or the reverse clutch 1024 are described in detail in a copending U.S. patent application Ser. No. 543,838 filed by Haruyoshi KUMURA et al. on Oct. 20, 1983 now U.S. Pat. No. 4,576,265 issued Mar. 18, 1986, commonly assigned herewith. This copending application has been incorporated herein by reference.

Figure 1A:
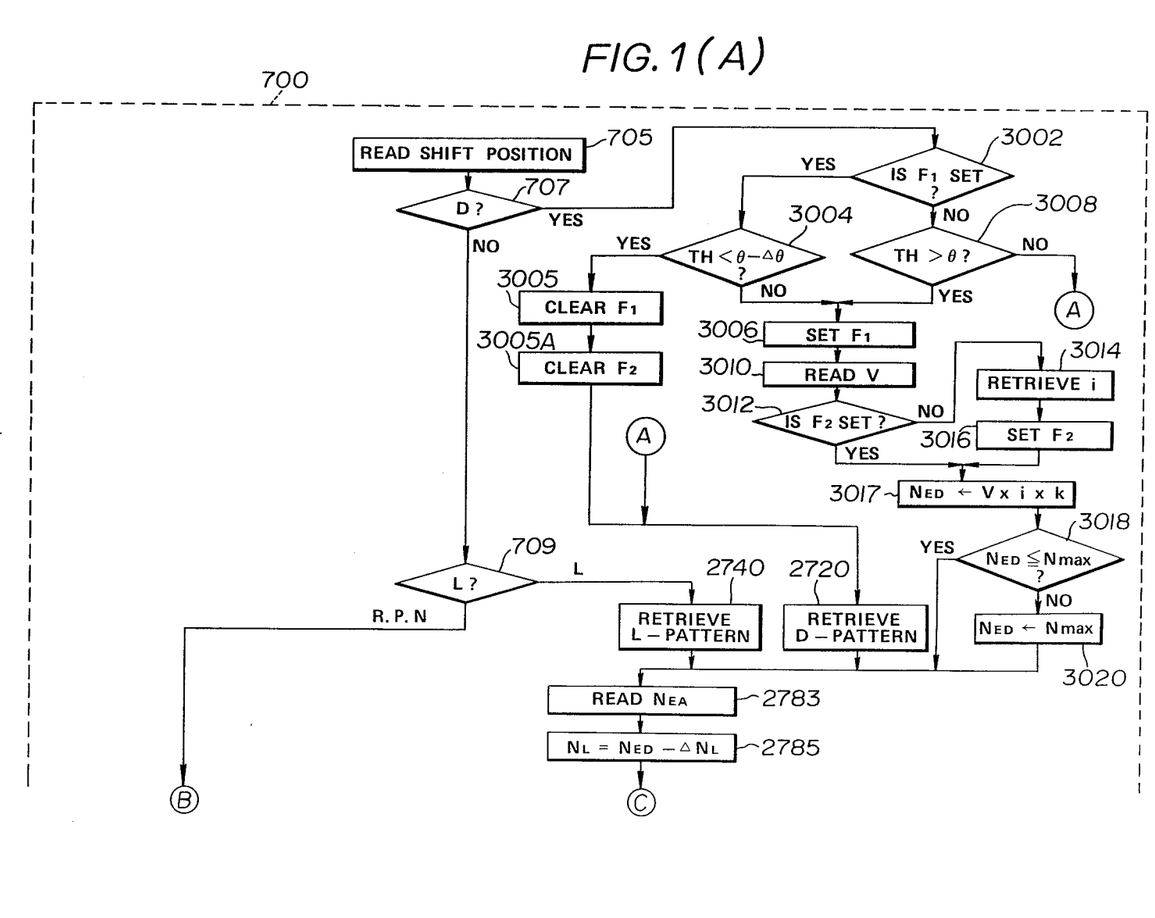
FIGS. 1(A) and 1(B), when combined, illustrate a flow chart of a series of operations which embody a method of controlling a continuously variable transmission according to the present invention.
Figure 1B:
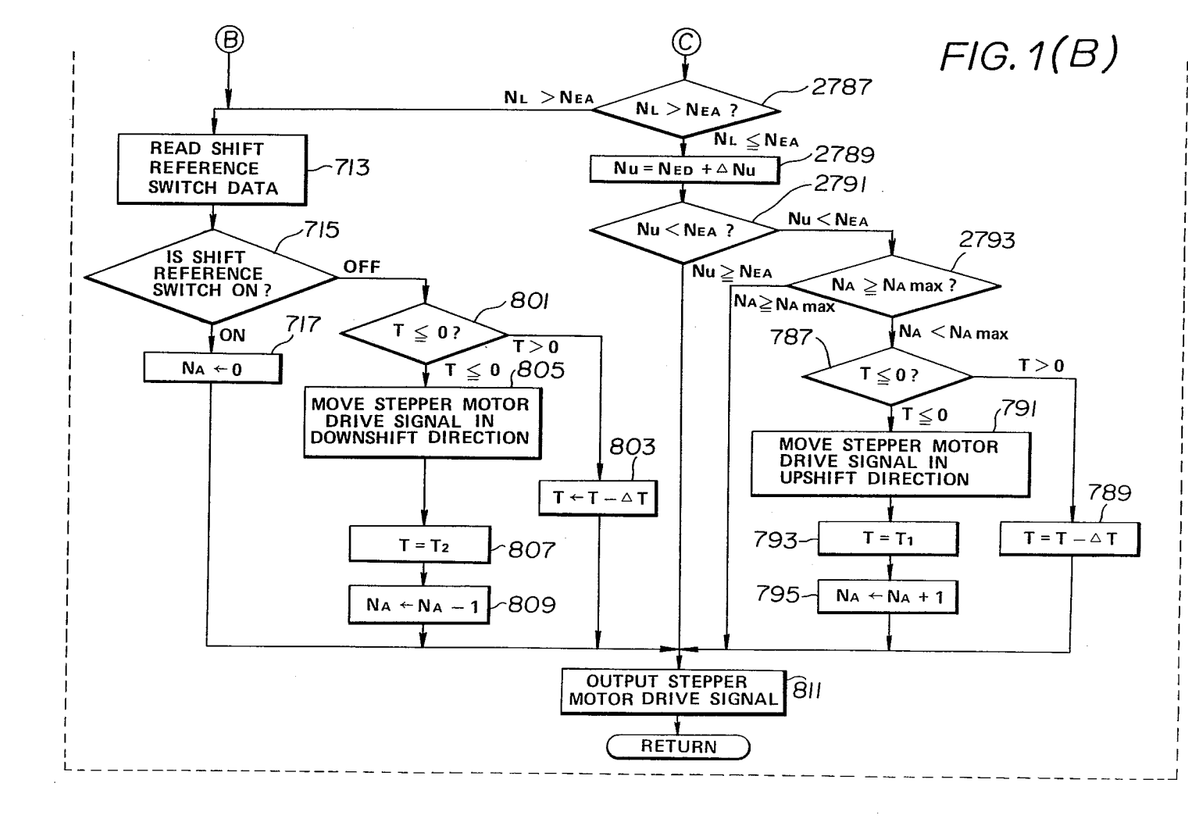

Referring to FIGS. 1(A) and 1(B), there is shown a flow chart illustrating a series of operations carried out by the control unit 1300. This series of operations is called as a stepper motor control routine 700. The stepper motor control routine 700 is described hereinafter along with FIGS. 1(A) and 1(B). The CPU 313 executes a force motor control routine 500 and a complete engagement control routine 600 before executing the stepper motor control routine 700. The operations by the CPU 313 in carrying out these routines 500 and 600 are described in the above mentioned copending application No. 548,838 which has been incorporated herein by reference (see FIGS. 4, 5(a) and 5(b)).

The stepper motor control routine 700 begins with reading a shift position from the shift position switch 304 at a step 705. Then, the CPU 313 proceeds to a step 707 to determine whether the shift position is placed at D (drive) position. If it is placed at the D position, the CPU 313 proceeds to a step 3002 to determine whether a flag $F_1$ is set. If the flag $F_1$ is set, a determination is made at a step 3004 whether a throttle opening degree TH already obtained at a step 507 of the force motor control routine 500 illustrated in FIG. 4 of the above mentioned copending U.S. application No. 543,838 (which has been incorporated herein by reference) is less than a predetermined value $\theta - \Delta\theta$. The value $\theta$ (theta) is equal to ⅝ throttle opening degree, and $\Delta\theta$ (delta theta) is a small value. If TH is less than $\theta - \Delta\theta$, the CPU 313 proceeds to a step 3005 and a step 3005A to clear flags $F_1$ and $F_2$, respectively, and then to a step 2720 to retrieve a D-range shift pattern. If TH is greater than or equal to $\theta - \Delta\theta$ at the step 3004, the CPU 313 proceeds to a step 3006 to set the flag $F_1$.

Figure 5:
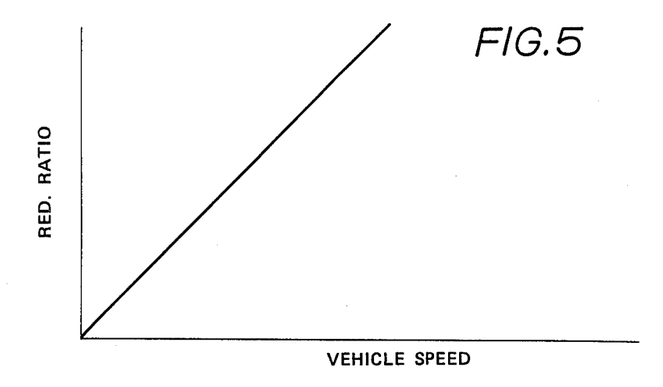
FIG. 5 is a graph showing a reduction ratio to be set as a predetermined reduction ratio after a throttle opening degree has exceeded to a predetermined value versus vehicle speed.

If, on the other hand, the flag $F_1$ is not set at the step 3002, the CPU 313 proceeds to a step 3008 to determine whether the throttle opening degree TH is greater than the value $\theta$ (theta). If TH is less than or equal to $\theta$ (theta), the CPU 313 proceeds to the step 2720 to retrieve a D-range shift pattern. If TH is greater than $\theta$ (theta) at the step 3008, the CPU 313 proceeds to the step 3006 to set the flag $F_1$ and to the step 3010 to read a vehicle speed V from the vehicle speed sensor 302. Thereafter, a determination is made whether the flag $F_2$ is set at the step 3012. If the flag $F_2$ is not set, the CPU 313 proceeds to a step 3014 to retrieve a reduction ratio i for the vehicle speed V by look-up table shown in FIG. 5. As illustrated in FIG. 5, the reduction ratio i increases as the vehicle speed V increases. This reduction ratio i obtained by this retrieval is a target reduction ratio to be set when the throttle opening degree TH has exceeded $\theta$ (theta) at the vehicle speed V. Thereafter, the flag $F_2$ is set at a step 3016 and then the CPU 313 proceeds to a step 3017. The flag $F_2$ is set at the step 3012 and the CPU 313 proceeds to step 3017, too. At the step 3107, the CPU 313 computes an equation, i.e., $V \times i \times k$, involving the vehicle speed V and the reduction ratio i to give a target engine speed $N_{ED}$ desired, where k is a constant. Then, the CPU 313 proceeds to a step 3018 to determine whether the target engine speed $N_{ED}$ is less than or equal to the maximum value $N_{max}$. If $N_{ED}$ is less than or equal to $N_{max}$, the CPU 313 proceeds to a step 2783, while it proceeds to a step 3020 to place $N_{max}$ as $N_{ED}$ before proceeding to the step 3020.

Figure 6:
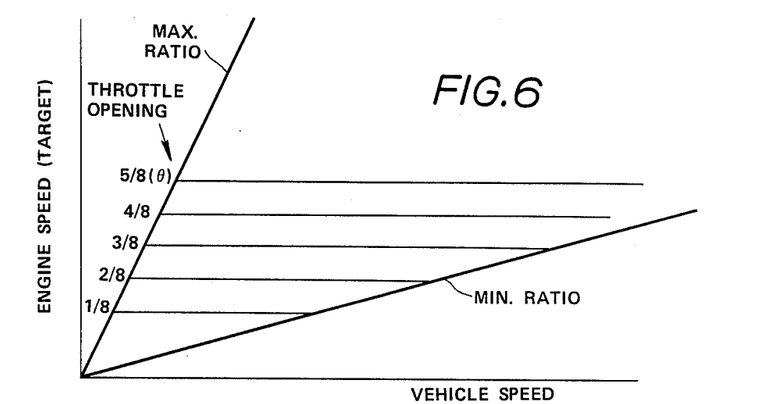
FIG. 6 is a graph showing a pattern to be selected when a throttle opening degree is less than the predetermined value.

Referring back to the above mentioned step 2720 where the D-range pattern is retrieved, the target engine speed values $N_{ED}$ are stored as a Table against vehicle speed V and throttle opening degree TH as illustrated in FIG. 6 and the Table is retrieved to give the appropriate target engine speed value $N_{ED}$ for V and TH obtained. After obtaining the target engine speed $N_{ED}$ at the step 2720 at step 3020, the CPU 313 proceeds to a step 2783 to read an actual engine speed $N_{EA}$ from the engine speed sensor 301 and then to a step 2785 to subtract a small value $\Delta N_L$ from the target engine speed $N_{ED}$ to place the result as the target engine speed lower limit value $N_L$. Then, the CPU 313 proceeds to a step 2787 to determine whether the actual engine speed $N_{EA}$ is less than $N_L$. If $N_{EA}$ is less than $N_L$, the CPU 313 proceeds to a step 713, while if $N_{EA}$ is greater than or equal to $N_L$, it proceeds to a step 2789. After the execution of the step 713, the CPU 313 proceeds to steps 715, 801 and 805 in this order to move a stepper motor drive signal in a downshift direction, and to a step 807 to set $T = T_2$, and then to a step 809 to decrease a stepper motor pulse number $N_A$ by 1. Since, after T has become greater than zero (0) at the step 801, the CPU 313 proceeds to a step 803 from the step 801, the stepper motor 1110 is caused to rotate by one step after lapse of the length of time $T_2$.

If, at the step 2787, $N_{EA}$ is greater than or equal to $N_L$, the CPU 313 proceeds to a step 2789 to add a predetermined small value $\Delta N_U$ to $N_{ED}$ to place the result as a target engine speed upper limit value $N_U$. Then, it proceeds to a step 2791 to determine whether $N_{EA}$ is greater than $N_U$. If $N_{EA}$ is greater than $N_U$, the CPU 313 proceeds to a step to determine whether the stepper motor pulse number $N_A$ is greater than or equal to a maximum value $N_{Amax}$. If $N_A$ is greater than or equal to $N_{Amax}$, the pulse number $N_A$ is unchanged and the stepper motor 1110 does not move. If $N_A$ is less than $N_{Amax}$, the CPU 313 proceeds to steps 787, 791, 793 and 795 to move the stepper motor drive signal in an upshift direction, set $T = T_1$ and increase $N_A$ by 1. Since, after T has become greater than zero (0), the CPU proceeds to a step 789 from the step 787, the stepper motor 1110 is caused to rotate in the upshift direction by one step after lapse of the length of time $T_1$.

As a result of the above mentioned operations, the actual engine speed $N_{EA}$ is controlled to assume a value disposed between the target engine speed upper and lower limit values $N_U$ and $N_L$. The operations to be executed if a step 2740 has been selected after the steps 707 and 709 will be readily understood from the flow chart, so that description thereof is omitted.

The series of operations discussed above will be further described referring to FIGS. 6, 7, 8, and 9. Let us now consider the case where the CPU 313 proceeds to the step 2720 after the step 3008 or step 3005A, i.e., in the case when the throttle opening degree TH stays less than $\theta$ (theta) or the throttle opening degree TH becomes less than $\theta - \Delta\theta$ once it has exceeded $\theta$. In these cases, the Table as illustrated in FIG. 6 is retrieved and the target engine speed $N_{ED}$ (corresponding to a reduction ratio) is determined for the throttle opening degree TH only. Let us consider the case where the CPU 313 proceeds to steps 3006, 3010, 3012, 3014, 3016, and 3017 after execution of the step 3008 or step 3004, i.e., in the case when the throttle opening degree stays greater than $\theta - \Delta\theta$ after it has exceeded $\theta$. At the step 3014, the CPU 313 fixes the reduction ratio i to a predetermined value that is obtained by retrieving the Table shown in FIG. 5 for a value in vehicle speed V that is obtained immediately after the throttle opening degree TH has exceeded $\theta$ (theta). Then, it proceeds to the step 3017 to compute the target engine speed $N_{ED}$ based on the reduction ratio i that is fixed. Since the reduction ratio i is fixed while the vehicle speed V varies, the target engine speed $N_{ED}$ varies with the variation in vehicle speed V. Therefore, as long as the throttle opening degree TH stays less than the predetermined value $\theta$ (theta), the target engine speed $N_{ED}$ is determined as a function of the throttle opening degree TH, only, while after the throttle opening degree TH has exceeded this value $\theta$ (theta), the target engine speed $N_{ED}$ increases as the vehicle speed V increases with the reduction ratio i fixed to a value that is set immediately after the throttle opening degree TH has exceeded $\theta$ (theta). Thus, the actual engine speed increases as the vehicle speed increases after the throttle opening degree TH has exceeded $\theta$ (theta).

Figure 7:
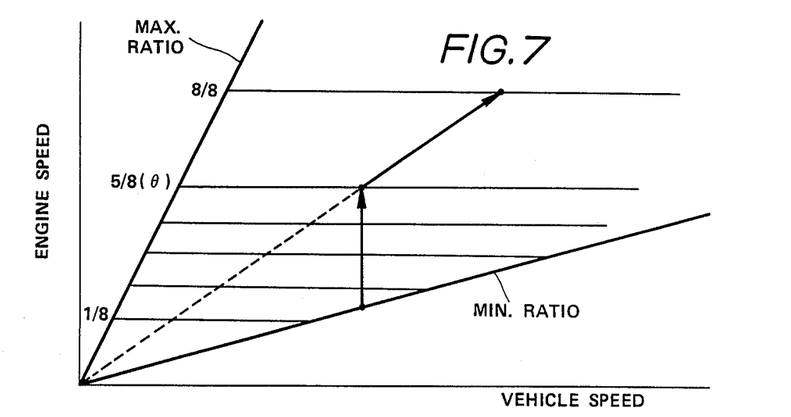
FIG. 7 is a graph illustrating the relationship between engine speed, throttle opening degree, and vehicle speed during a shift.

Describing the above operations referring to FIG. 7, the throttle opening degree is increased rapidly under a stable running condition where the throttle opening degree is small as illustrated by an operation point A. This causes the target engine speed to move (FIG. 8) to an operation point B, initiating a shift in reduction ratio in the continuously variable transmission to cause the actual engine speed to change. As shown by the solid line in FIG. 8, the actual engine speed increases from the point A to the point B during a length of time $T_0$ to $t_1$. During this length of time $t_0$ to $t_1$, the driving force stays almost unchanged as shown by the solid line in FIG. 9. However, since, at the point B, the reduction ratio is fixed upon completion of the shift operation, the engine speed varies with the vehicle speed $N_{ED}$ after the instance $t_1$, as shown by the solid line in FIG. 8 because the target engine speed $N_{ED}$ is computed at the step 3016 with the fixed reduction ratio. As a result, an appropriate acceleration feel is provided. When arriving at an operation C, the reduction ratio is varied again to cause the vehicle speed to increase without causing the engine speed to increase further so as to prevent engine speed from excessively increasing. It will now be understood from comparison of the solid line with the dashed line in FIG. 9 that an increased acceleration feel is provided according to the present invention at an early timing as compared to the previously discussed known method.

Although in the described embodiment, the engine revolution speed is used as a target of control, the reduction ratio may be used as a target of control.

What is claimed is:

1. A method of controlling a continuously variable transmission for a motor vehicle having an engine that operates subject to a varying load, the continuously variable transmission having an input shaft drivingly connected to the engine, the method comprising the steps of:

detecting the load and generating a load indicative signal indicative of the load detected;

comparing said load indicative signal to a predetermined value;

determining an actual value of a parameter which is related to the actual reduction ratio of the continuously variable transmission and generating an actual value indicative signal;

generating a first target value indicative signal indicative of a target value of said parameter, said first target value being variable in a first pattern in correspondence with said load indicative signal;

controlling a shift in reduction ratio in the continuously variable transmission in such a manner as to bring said actual value indicative signal into correspondence with said first target value indicative signal when said load indicative signal is below said predetermined value;

generating a second target value indicative signal indicative of a second target value of said parameter; and keeping said actual reduction ratio of the continuously variable transmission substantially at a predetermined constant reduction ratio when the load indicative signal is greater than said predetermined value by controlling the reduction ratio so as to bring said actual value indicative signal into correspondence with said second target value.

2. A method as claimed in claim 1, wherein said predetermined reduction ratio is variable with speed of the vehicle and is determined for the vehicle speed when said load indicative signal is less than said predetermined value.

3. A method as claimed in claim 1, including the step of shifting the continuously variable transmission from said predetermined reduction ratio when the engine speed reaches a predetermined engine speed value.

4. A method of controlling a continuously variable transmission for a motor vehicle having an engine that operates subject to a varying load, the continuously variable transmission having an input shaft drivingly connected to the engine, the method comprising the steps of:

detecting the load and generating a load indicative signal indicative of the load detected;

detecting an actual engine speed of the engine and generating an actual engine speed indicative signal;

generating a first target engine speed value indicative signal indicative of a target engine speed which is variable in a first pattern in correspondence with said load indicative signal;

controlling the reduction ratio in the continuously variable transmission so as to bring said actual engine speed value indicative signal into correspondence with said first target engine speed value indicative signal before said load indicative signal exceeds a predetermined value;

detecting a vehicle speed of the vehicle and generating a vehicle speed indicative signal;

determining a predetermined reduction ratio as a predetermined function of said vehicle speed indicative signal upon said load indicative signal exceeding said predetermined value and generating a predetermined reduction ratio indicative signal;

determining a second target engine speed value in response to said vehicle speed indicative signal and said predetermined reduction ratio indicative signal after said load indicative signal has exceeded said predetermined value, generating a second target engine speed value indicative signal indicative of said second target engine speed value; and controlling the reduction ratio of the continuously variable transmission in such a manner as to bring said actual engine speed value indicative signal into correspondence with said second engine speed value signal, thus allowing the engine speed to increase with the vehicle speed.

5. A method as claimed in claim 4, wherein said predetermined function is such that the reduction ratio varies in proportion to the vehicle speed.

6. A method as claimed in claim 5, wherein said second target value indicative signal is the product of said vehicle speed indicative signal and said predetermined reduction ratio indicative signal.

7. A method as claimed in claim 6, wherein said second target engine speed value indicative signal is indicative of a predetermined maximum value when said second target engine speed indicative signal is greater than said predetermined maximum value.

* * * * *